United States Patent [19]

Matsushita

[11] Patent Number: 4,828,090
[45] Date of Patent: May 9, 1989

[54] ELECTROMAGNETIC CLUTCH
[75] Inventor: Takashi Matsushita, Isesaki, Japan
[73] Assignee: Sanden Corporation, Gunma, Japan
[21] Appl. No.: 31,705
[22] Filed: Mar. 30, 1987
[30] Foreign Application Priority Data Mar. 28, 1986 [JP] Japan .............................. 61-46343[U]

[51] Int. Cl.$^4$ .................. F16D 27/10; F16D 3/12; F16D 3/76
[52] U.S. Cl. .............................. 192/84 C; 192/106.1; 192/113 A; 464/89
[58] Field of Search .............. 192/84 C, 106.1, 113 A, 192/30 V; 464/89, 92, 180, 17

[56] References Cited

U.S. PATENT DOCUMENTS

| | | |
|---|---|---|
| 1,674,225 | 6/1928 | Reed . |
| 1,719,624 | 7/1929 | Reed .................. 192/106.1 |
| 1,721,504 | 7/1929 | Reed . |
| 1,825,981 | 10/1931 | Reed . |
| 1,906,057 | 4/1933 | Guy . |
| 1,954,190 | 4/1934 | Zeder . |
| 1,964,054 | 6/1934 | Harris . |
| 1,984,578 | 12/1934 | Griswold . |
| 2,105,702 | 1/1938 | Scholtze . |
| 3,205,989 | 9/1965 | Mantley .............. 192/84 C |
| 3,314,512 | 4/1967 | Kerestury . |
| 3,384,213 | 5/1968 | Bernard et al. . |
| 3,425,529 | 2/1969 | Hayashi .............. 192/84 C |
| 3,565,223 | 2/1971 | Pierce ................ 192/84 C |
| 3,752,279 | 8/1973 | Briar ................. 192/84 C |
| 4,172,369 | 10/1979 | Hayes et al. . |
| 4,432,446 | 2/1984 | Okano et al. ........ 192/84 C |
| 4,445,606 | 5/1984 | Van Laningham ...... 192/106.1 |
| 4,493,407 | 1/1985 | Newton .............. 192/84 C |
| 4,624,354 | 11/1986 | Koitabashi .......... 192/84 C |
| 4,718,526 | 1/1988 | Koitabashi .......... 192/35 |

FOREIGN PATENT DOCUMENTS

| | | |
|---|---|---|
| 2733880 | 2/1978 | Fed. Rep. of Germany . |
| 55-123028 | 9/1980 | Japan . |
| 57-192631 | 11/1982 | Japan . |
| 642694 | 9/1950 | United Kingdom . |
| 709115 | 5/1954 | United Kingdom . |
| 960074 | 6/1964 | United Kingdom . |
| 2024368 | 1/1980 | United Kingdom . |

Primary Examiner—Rodney H. Bonck
Assistant Examiner—Richard M. Lorence
Attorney, Agent, or Firm—Banner, Birch, McKie & Beckett

[57] ABSTRACT

An electromagnetic clutch is disclosed that includes a pulley and an electromagnetic mechanism. A hub is secured on a drive shaft and has a radially extending flange portion. An armature plate is concentrically disposed on the hub and faces the axial end surface of the pulley with an axial air gap therebetween. A holder plate is fixed on an outer axial end surface of the armature plate and is formed with a triangularly axially extending flange. The radial flange portion of the hub is also formed with a second axially extending flange corresponding to the first flange. The first and second axially extending flanges are formed of a similar configuration and face one another with a radial gap. An elastic member is disposed in the radial gap to ease the impact force created when the clutch is engaged.

10 Claims, 2 Drawing Sheets

ELECTROMAGNETIC CLUTCH

TECHNICAL FIELD OF THE INVENTION

This invention relates generally to an electromagnetic clutch, and more particularly, to an improved connecting structure between an armature plate and a hub of an electromagnetic clutch, for transmitting rotational force supplied by a pulley to the drive shaft of a compressor.

BACKGROUND OF THE INVENTION

A conventional electromagnetic clutch with an elastic member for easing the impact force transmitted to the drive shaft of a compressor is disclosed in U.S. Pat. No. 3,774,739 to Higuchi, and is illustrated in FIG. 1. The clutch comprises pulley 1 which is supported on bearing 2 and is rotated by an automotive engine through a belt (not shown). Pulley 1 is formed of a magnetic material in which one or more concentric arcuate or annular slits 3 are formed to define a plurality of concentric annular magnetic poles. Hub 5 is fixed on the terminal end of drive shaft 4. Holder plate 8 and the outer end portion of hub 5 are formed with concentrically disposed cylindrically shaped flanges 81 and 51. Rubber member 9 is disposed in the space defined between axial flanges 81 and 51. Therefore, armature plate 6 is connected to hub 5 through holder plate 8 and rubber member 9. Rubber member 9 therefore functions to ease the transmission of sudden torque changes to the drive shaft. These sudden torque changes impart an impact force on rubber member 9 which induces a bending or shearing stress on the rubber member. This intermittently applied stress to the rubber member may cause the rubber member to crack and eventually be destroyed.

One solution to overcome the above mentioned disadvantages is disclosed in U.S. Pat. No. 4,624,354 to Koitabashi and is illustrated in FIG. 2. This electromagnetic clutch comprises holder plate 8' and outer end hub 5' both of which are provided with concentrically positioned polygonally shaped axial flanges 81' and 51', and rubber member 9' which is disposed between axial flanges 81' and 51'. The polygonal shape reduces the shearing stress in the rubber member and the durability of the rubber member is thus improved.

However, the rubber member used in both of these conventional electromagnetic clutches is affixed on the axial flanges 81' and 51' by adhesive materials, and the adhesive strength of the adhesive materials fails with the passing of time. As a result, the rubber member becomes detached from the surface of axial flanges 81' and 51'. Also, the adhesive portion of the rubber member may be damaged.

SUMMARY OF THE INVENTION

It is a primary object of this invention to provide an electromagnetic clutch with a mechanism for easing the impact force transmitted to the drive shaft.

It is another object of this invention to provide an electromagnetic clutch with improved durability of an elastic member which connects the drive shaft to the clutch.

An electromagnetic clutch according to the present invention includes a first rotatable member with an axial end plate of magnetic material, and a second rotatable member secured on a hub. The hub includes a radially extending flange portion. An annular armature plate is concentrically disposed on and radially surrounds the outer peripheral portion of the hub with a gap therebetween. The armature plate faces the axial end plate of the first rotatable member with an axial air gap therebetween. An electromagnetic means is disposed within the first rotatable member for attracting the armature plate to the axial end plate of the first rotatable member. A holder plate is fixed on an axial end surface of the armature plate and is formed with a first axially extending flange portion. The radial flange portion of the hub has a second axially extending flange portion. The first and second axial flanges are polygonally shaped and face one another with a radial gap therebetween. An elastic member is disposed in the radial gap and, therefore, the impact force is eased by the compressive deformation of the elastic member when the clutch is engaged. Excessive twisting deformation of the elastic member is thus prevented.

Further objects, features and other aspects of this invention will be understood from the following detailed description of the preferred embodiment of this invention while referring to the annexed drawings.

DETAILED DESCRIPTION

Figure 1:
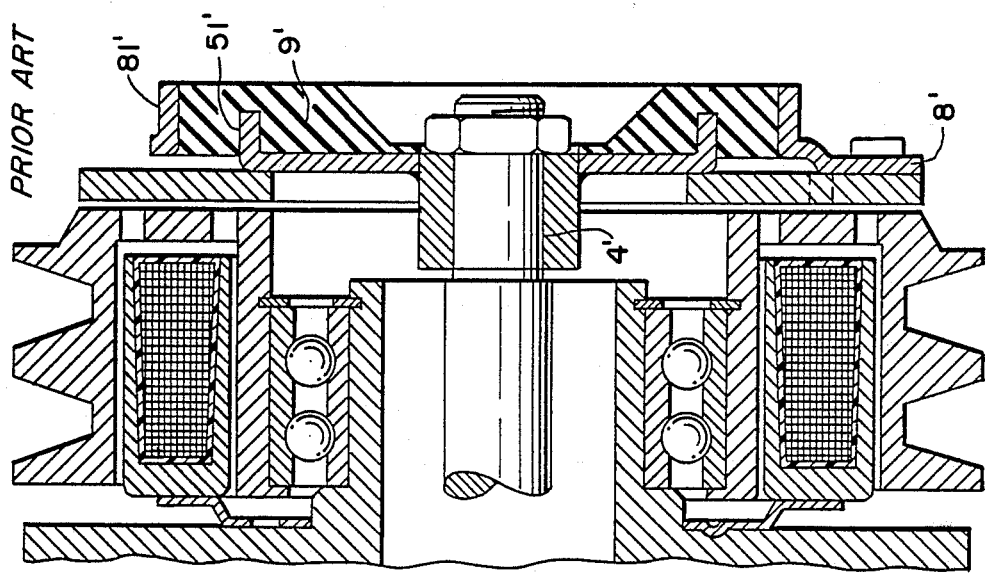
FIG. 1 is a cross-sectional view of a conventional electromagnetic clutch.
Figure 2:
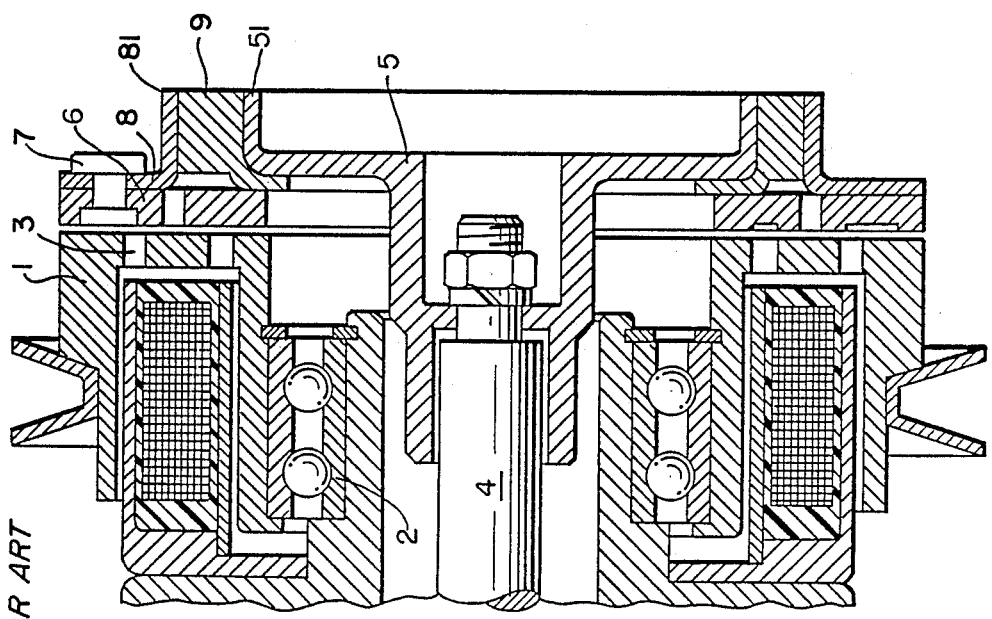
FIG. 2 is a cross-sectional view of a second conventional electromagnetic clutch.
Figure 4:
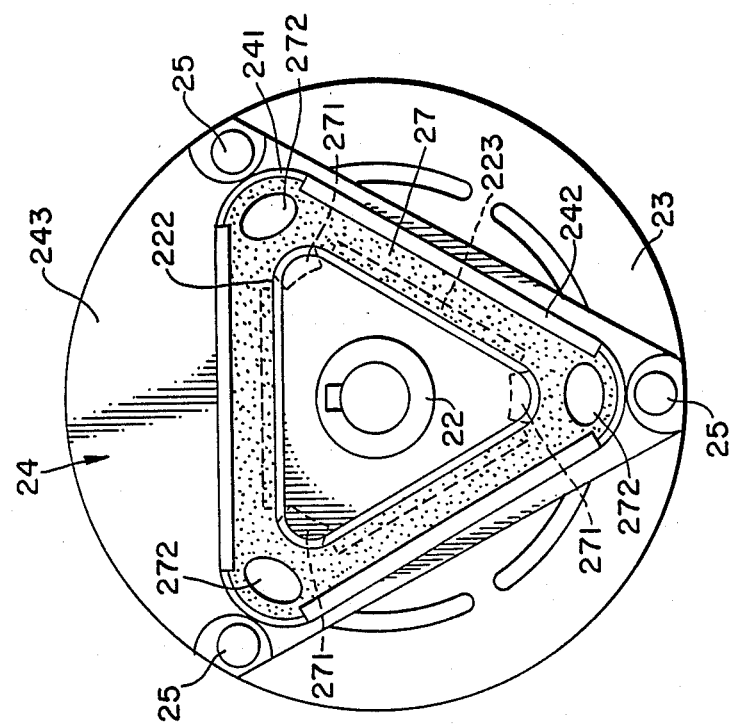
FIG. 4 is a front view of the electromagnetic clutch of FIG. 3.
Figure 3:
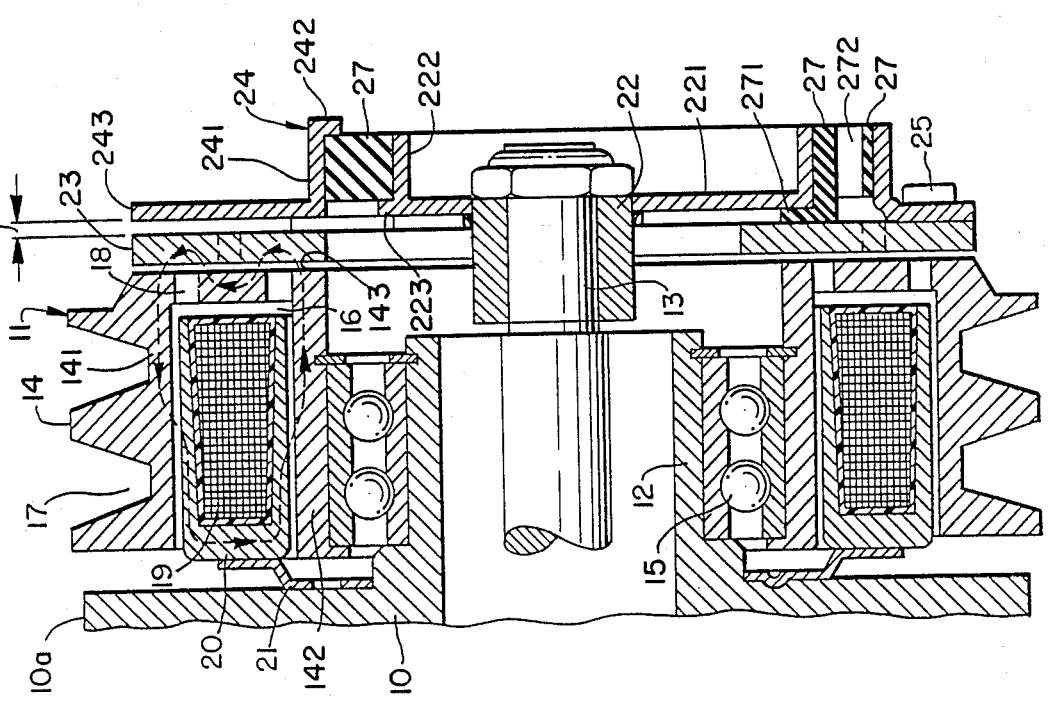
FIG. 3 is a cross-sectional view of an electromagnetic clutch in accordance with the present invention.

Referring to FIGS. 3 and 4, which illustrate an electromagnetic clutch 11 in accordance with the present invention, the clutch is shown assembled on compressor 10 for an automotive air conditioning system. Compressor housing 10a is provided with cantilevered tubular extension 12 surrounding drive shaft 13 of the compressor. Drive shaft 13 is rotatably supported in the compressor housing 10a by a bearing (not shown).

Pulley 14 is rotatably supported on tubular extension 12 through bearing 15 which is mounted on the outer peripheral surface of tubular extension 12. Pulley 14 is made of magnetic material, such as steel, and comprises outer annular cylindrical portion 141, inner annular cylindrical portion 142 and axial end plate portion 143 connecting outer and inner cylindrical portions 141, 142. Annular U-shaped cavity 16 is thus defined between these three portions 141, 142 and 143. Annular V-shaped grooves 17 are provided on the outer peripheral surface of cylindrical portion 141 of pulley 14 for receiving a V-belt (not shown) for coupling the compressor to the output shaft of an automobile engine (not shown).

Axial end plate portion 143 include one or more concentric slits 18 which are disposed on one or more concentric circles, so that a plurality of annular or arcuate magnetic portions are defined, with the magnetic surfaces being on the axial end surface of axial end plate portion 143.

Electromagnetic coil 19 is disposed in annular cavity 16 of pulley 14. Coil 19 is contained within annular magnetic coil housing 20 having a U-shaped cross section. Coil housing 20 is fixed to supporting plate 21 which is secured to compressor housing 10a. Coil housing 20 is thus maintained within cavity 16 out of contact with pulley 14 by a small gap.

A hub 22 is secured to an extending terminal end of shaft 13. Hub 22 has a radial flange portion 221 extending radially outward. Ring plate or armature plate 23 is disposed adjacent the outer peripheral surface of flange portion 221 with an annular radial gap therebetween. Armature plate 23 faces the axial end plate portion 143 of pulley 14 with a predetermined axial air gap therebetween.

In this construction, holder plate 24 is fixed on the outer axial end surface of armature plate 23 by a plurality of rivets 25. Holder plate 24 is provided with a first axial flange 241 which extends axially outward from the inner end portion of plate 24 and is formed in a triangular shape. An arc-shaped disc portion 243 extends radially outward at one side of triangular flange 241, as shown in Figure 4. Each straight line portion of triangular flange 241 is connected with one another through an arc-shaped corner. The configuration of flange 241 thus consists of a plurality of line and arc portions. Axial gap 26 is formed between the axial end surface of armature plate 23 and the axial end portion of flange 241, as shown in FIG. 3.

Hub 22 is formed with second axial flange portion 222 which extends axially outward from the outer end portion of radial flange portion 221. Second axial flange portion 222 corresponds in shape to flange portion 241 and faces flange 241 with a radial gap therebetween.

Elastic member 27, i.e., a rubber member, is disposed in the gap defined between the inner surfaces of flange portions 222 and 241. The inner surface of elastic member 27 is fixed on the outer surface of axial flange portion 222 of hub 22 by vulcanization, and elastic member 27 is fixedly disposed within the gap so as to be urged radially inward by axial flange 241. Alternatively, if first and second fixed flange portions 242, 223 are formed on the outer terminal end of first axial flange 241 and the outer terminal end of radial flange 221, respectively, to restrict the axial movement of elastic member 27, elastic member 27 will be able to maintain its position in the radial gap without the use any special affixing method. Therefore, armature plate 23 maintains its static position to face the axial end plate portion 143 with an axial air gap therebetween by the recoil strength of elastic member 27.

In this construction, if coil 19 is not energized, armature plate 23 is separated from pulley 14 by the recoil strength of elastic member 27 and maintains the desired air gap. Therefore, only pulley 14 will be driven by the engine of the automobile, and the compressor will not be operated. When coil 19 is energized, however, armature plate 23 is attracted to pulley 14 by the magnetic flux which is created by the energization of coil 19 and indicated by the dotted line in FIG. 3 and elastic member 27 is bent in the axial direction. The rotating motion of the automotive engine is transmitted to drive shaft 13 of the compressor through pulley 14, armature plate 23, holder plate 24, elastic member 27 and hub 22.

At the moment armature plate 23 contacts the axial end plate portion 143 of pulley 14, elastic member 27 receives an impact force caused by the torque of holder plate 24. However, the impact force is eased by the deformation of elastic member 27. That is, relative rotating motion between the axial flanges is limited and excessive shearing stress acting on the rubber member will be reduced to thereby prevent the rubber member from becoming damaged.

Elastic member 27 is provided with extended portions 271 which extend radially inward at each corner thereof. Extending portions 271 are fixedly disposed between first radial flange portion 221 of hub 22 and the outer end surface of armature plate 23 by securing rivets 25. These portions help to ensure that the rubber member will not move. In order to reduce the temperature of rubber member 27 during operation of the device, communicating holes 272 are formed through each corner to allow air to flow between the axial gap 26 and ambient space. Therefore, heat fatigue of rubber member 27 will be reduced.

This invention has been described in detail in connection with the preferred embodiments only and the invention is not restricted thereto. It will be easily understood by those skilled in the art that other variations can be made within the scope of the invention.

I claim:

1. In an electromagnetic clutch comprising a first rotatable member having an axial end plate of magnetic material, a second rotatable member and an armature plate of magnetic material joined to the second rotatable member so as to be capable of limited axial movement, said armature plate facing said axial end plate of said first rotable member with an axial air gap therebetween, and an electromagnetic means associated with said axial end plate for attracting said armature plate into engagement with said axial end plate whereby the rotation of said first rotatable member can be transmitted to said second rotatable member through said armature plate by the operation of said electromagnetic means, the improvement comprising: a holder palte affixed to the outer axial surface of said armature plate and formed with a first axial flange portion extending outwardly from said armature plate, said first axial flange portion having a configuration including at least one straight line, said second rotatable member having a second axial flange portion extending outwardly from armature plate, said first and second axial flange portions having inner and outer surfaces facing one another with a radial gap therebetween, said first axial flange portion having a radial flange at one end thereof extending toward said second axial flange portion, said second axial flange portion having a radial flange at an end opposite said one end of said first axial flange portion extending toward said first axial flange portion, and elastic means disposed between the inner and outer surfaces of said axial flange portions and said radial flanges within the radial gap for limiting the relative rotation between said first and second axial flange portions by the compression of said elastic means when said armature plate engages said axial end plate upon operation of said electromagnetic means.

2. The electromagnetic clutch of claim 1 wherein said elastic means is formed with at least one hole to allow for the flow of air.

3. The electromagnetic clutch of claim 1 wherein said first and second flange portions are substantially triangular in shape.

4. The electromagnetic clutch of claim 3 wherein each corner of each of said flange portions is substantially arc shaped.

5. The electromagentic clutch of claim 1 wherein each of said flange portions is formed of a plurality of arc-shaped portions and straight portions.

6. The electromagnetic clutch of claim 5 wherein each of said flange portions is formed of three generally straight lines.

7. The electromagnetic clutch of claim 1 wherein said elastic means has at least one extended portion which extends between said second flange portion and said armature plate.

8. The electromagnetic clutch of claim 1 wherein said elastic means includes a polygonal cross section.

9. The electromagnetic clutch of claim 8 wherein the polygonal cross section is square.

10. The electromagnetic clutch of claim 1 wherein said elastic means forms a loop disposed within the radial gap.

* * * * *